US00RE38187E

(19) United States
(12) Reissued Patent
Bellehumeur et al.

(10) Patent Number: US RE38,187 E
(45) **Date of Reissued Patent: *Jul. 15, 2003**

(54) PUCK FOR USE ON A NON-ICE SURFACE

(76) Inventors: Alex R. Bellehumeur, 6242 Napoli Ct., Long Beach, CA (US) 90803; John R. Nehmens, II, 13424 Wandering Ridge Way, Chino Hills, CA (US) 91709; Guy W. Haarlammert, 3272 Skyview Ridge, Chino Hills, CA (US) 91797

( * ) Notice: This patent is subject to a terminal disclaimer.

(21) Appl. No.: 10/057,671

(22) Filed: Jan. 24, 2002

Related U.S. Patent Documents

Reissue of:
(64) Patent No.: 5,597,161
Issued: Jan. 28, 1997
Appl. No.: 08/590,870
Filed: Jan. 24, 1996

(60) Continuation of application No. 08/303,589, filed on Sep. 9, 1994, now abandoned, which is a continuation of application No. 08/150,420, filed on Nov. 10, 1993, now abandoned, which is a division of application No. 07/949,077, filed on Sep. 22, 1992, now Pat. No. 5,275,410.

(51) Int. Cl.[7] ..... A63B 71/00
(52) U.S. Cl. ..... 473/588
(58) Field of Search ..... 473/588, 589, 473/FOR 229, FOR 230, FOR 231

(56) References Cited

U.S. PATENT DOCUMENTS

| | | | | | |
|---|---|---|---|---|---|
| 1,909,941 | A | * | 5/1933 | Finch | 206/37.1 |
| 1,976,198 | A | * | 10/1934 | Steenrod | 281/27.3 |
| 2,511,051 | A | * | 6/1950 | Dzus | 411/338 |
| 2,560,110 | A | * | 7/1951 | Horn | 221/26 |
| 2,727,744 | A | * | 12/1955 | Watson | 473/588 |
| 2,797,605 | A | * | 7/1957 | Metze, Jr. | 402/48 |
| 3,726,526 | A | * | 4/1973 | Radovich | 473/588 |
| 3,784,204 | A | * | 1/1974 | Felber | 473/588 |
| 3,997,164 | A | * | 12/1976 | White, Sr. | 473/446 |
| 4,033,243 | A | * | 7/1977 | Kirrish et al. | 411/338 |
| 4,078,801 | A | * | 3/1978 | White, Sr. | 473/588 |
| 4,111,419 | A | * | 9/1978 | Pellegrino | 273/128 R X |
| 4,113,419 | A | * | 9/1978 | Cade | 236/46 F |
| 4,657,459 | A | * | 4/1987 | Landt | 411/188 |
| 5,149,096 | A | * | 9/1992 | Keating et al. | 473/588 |
| 5,275,410 | A | * | 1/1994 | Bellehumeur et al. | 473/588 |
| 5,597,161 | A | * | 1/1997 | Bellehumeur et al. | 473/588 |

FOREIGN PATENT DOCUMENTS

| | | | |
|---|---|---|---|
| DE | 2506181 | * | 8/1976 |
| FR | 0309117 | * | 1/1962 |

* cited by examiner

*Primary Examiner*—Raleigh W. Chiu
(74) *Attorney, Agent, or Firm*—Edgar W. Averill, Jr.

(57) ABSTRACT

A puck for use on a non-ice surface such as cement. The puck has an outer ring made from plastic or other elastic material so that it will deform slightly when the side of the puck is struck against a wall or other object. The runners extend upwardly from the upper and lower surfaces of the puck to reduce the friction of the puck against the floor surface.

3 Claims, 5 Drawing Sheets

Fig. 1
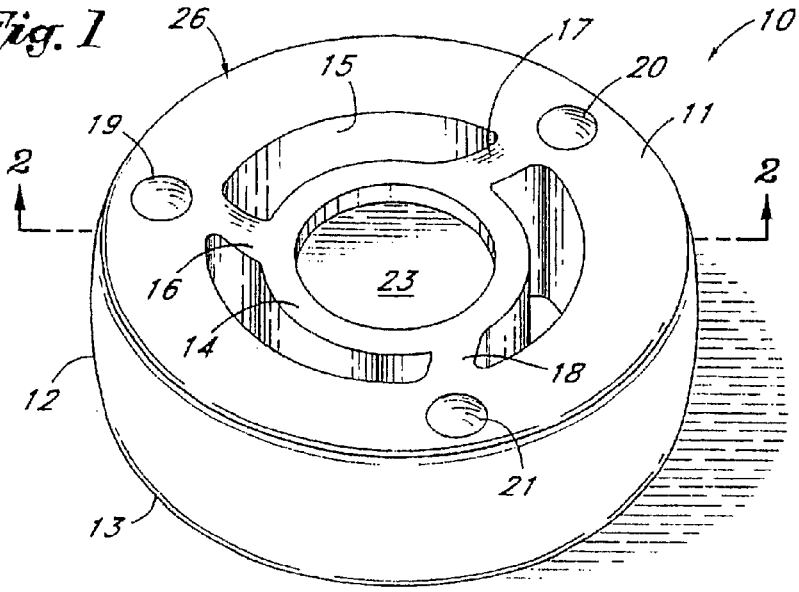
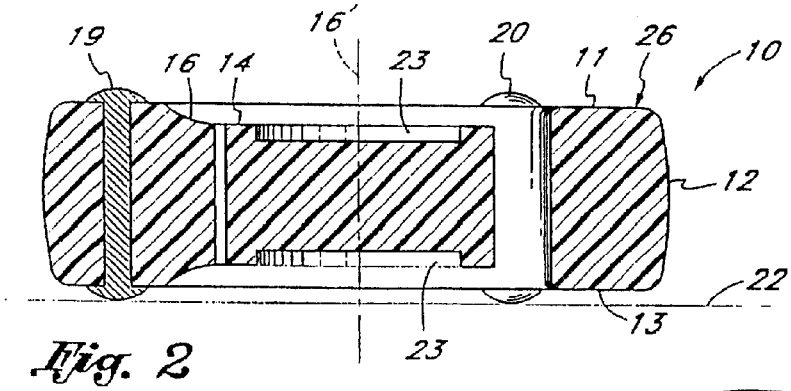
Fig. 2
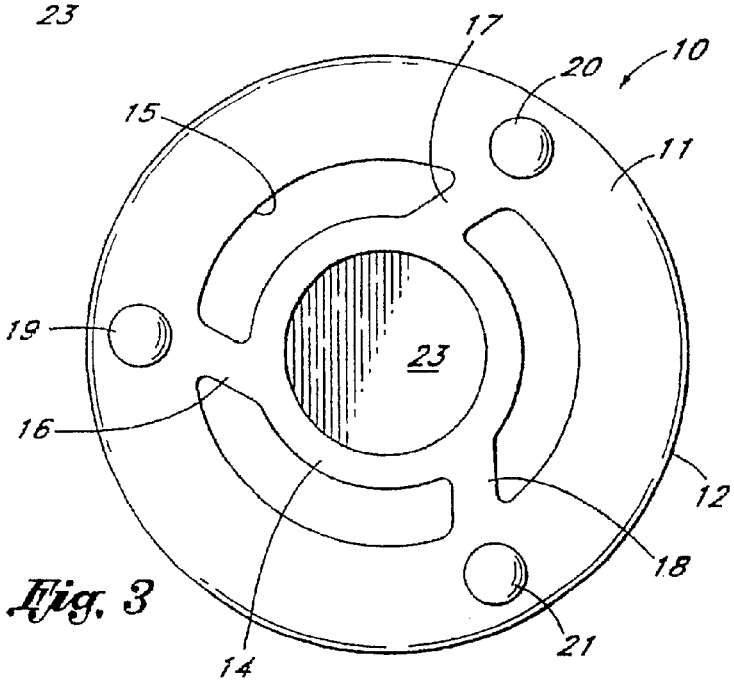
Fig. 3

Fig. 6
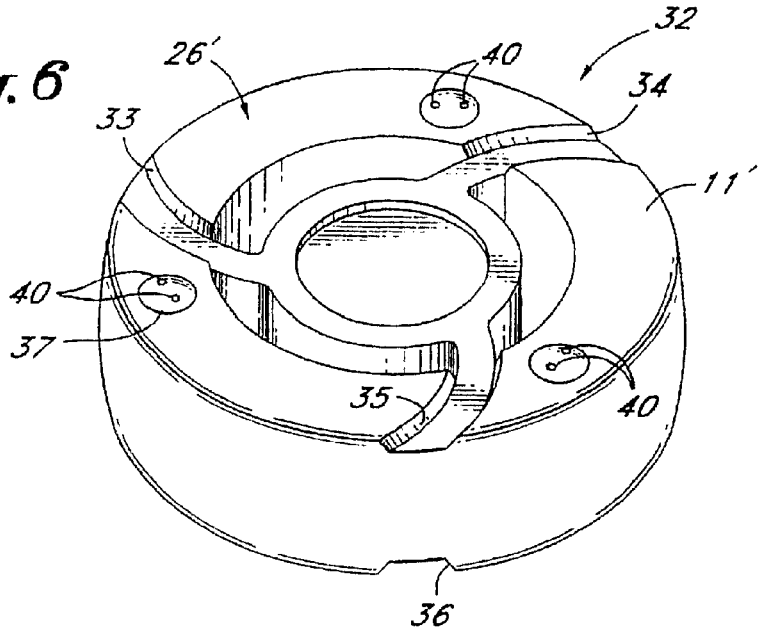
Fig. 7
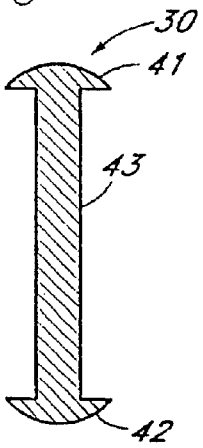
Fig. 8
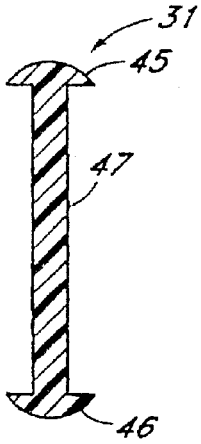
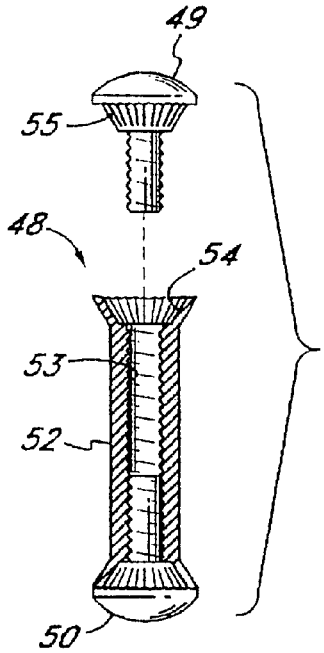
Fig. 9
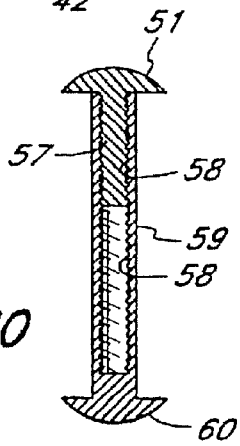
Fig. 10
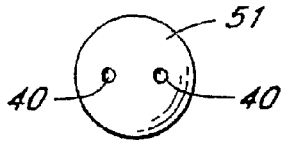
Fig. 11

Fig. 12
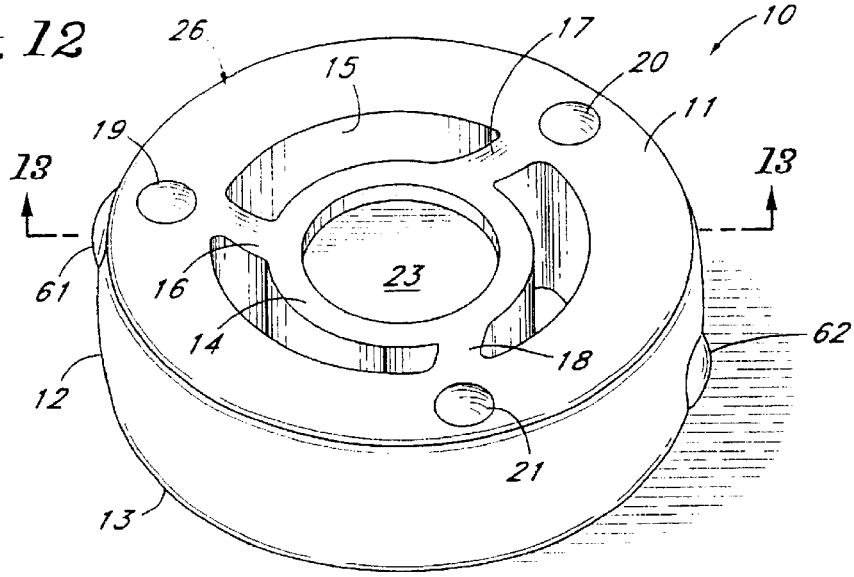
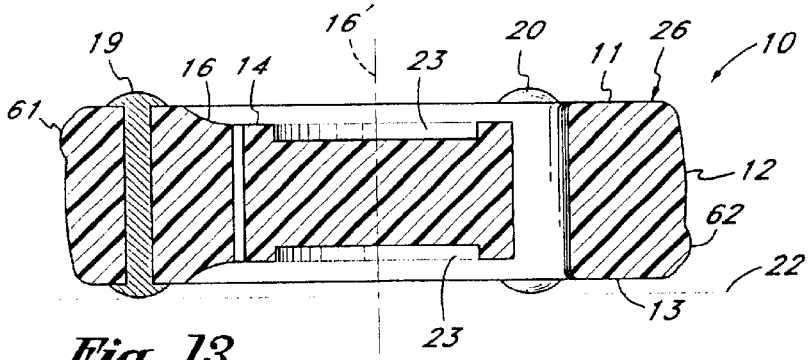
Fig. 13
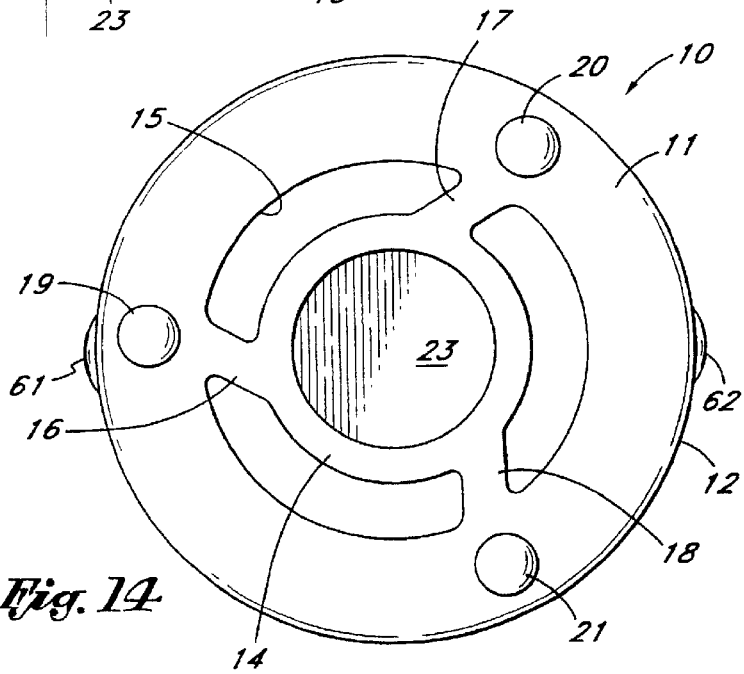
Fig. 14

Fig. 15
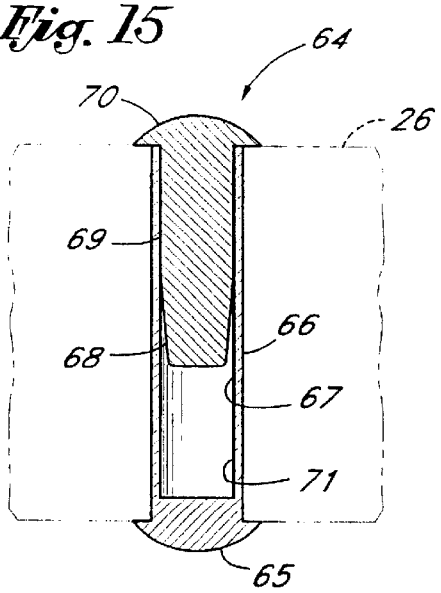
Fig. 16
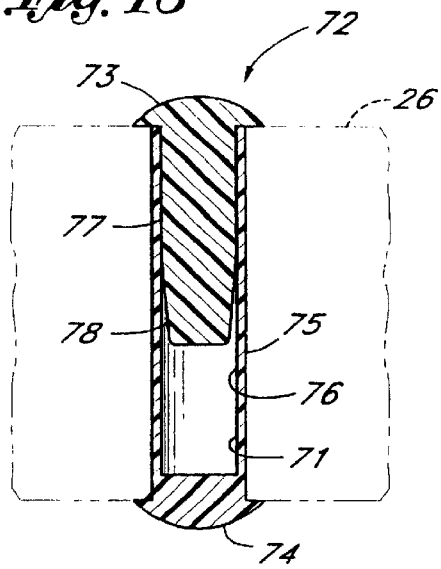
Fig. 17
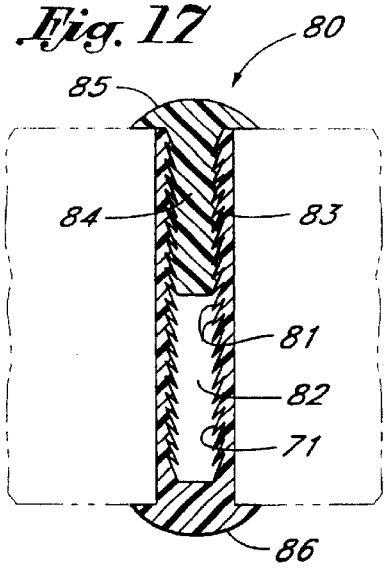
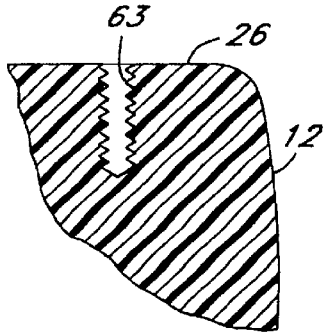
Fig. 18

PUCK FOR USE ON A NON-ICE SURFACE

Matter enclosed in heavy brackets [ ] appears in the original patent but forms no part of this reissue specification; matter printed in italics indicates the additions made by reissue.

This application is a continuation of application Ser. No. 08/303,589 filed on Sep. 9, 1994, now abandoned which is a continuation of Ser. No. 08/150,420, filed on Nov. 10, 1993, now abandoned, which is a divisional of Ser. No. 07/949,077, filed on Sep. 22, 1992, now U.S. Pat. No. 5,275,410.

BACKGROUND OF THE DISCLOSURE

The field of the invention is sporting goods and the invention relates particularly to pucks of the type that are used on a surface other than ice.

Ice hockey has been a popular sport for many years but is, of course, limited to cold climates or artificially made ice rinks. With the advent of in-line roller skates, it is possible to skate across a non ice surface in a manner quite similar to skating on ice. It has quite naturally led to the game of roller hockey. It was found that the normal relatively hard rubber puck would not slide on a cement surface in a satisfactory manner. Furthermore, the puck could easily cause injury when striking a player.

Various styles of pucks for use on non ice surfaces have been devised. Such pucks are shown in U.S. Pat. Nos. 4,111,419; 3,997,164; 4,801,144; 3,726,526; 3,784,204; and 2,727,744. Several of these pucks have runner type devices which are rotatable such as a ball bearing intended to reduce friction and this has been found to be unsatisfactory in actual use because of the ease with which runners become frozen and inoperative due to clogging with foreign matter during play. None of the devices have the ability of unrestricted rotation. Furthermore, such devices require more material which adds to their weight.

A hollow plastic puck filled with rice became the early puck of choice. This rice filled puck, while superior to the ice hockey puck, did not slide sufficiently over the surface and therefore, a puck with a lower coefficient of friction was needed to increase speed. Also, the rice or other internal substance causes the puck to move in a somewhat unpredictable path. This is because the rice or other material shifts within the hollow puck during play. Furthermore, the outer surface of the rice puck became rough and slowed down during play. The inner design also helps to regulate the extent of deflection.

SUMMARY OF THE INVENTION

It is an object of the present invention to provide a puck for use on non ice surface which will approximate the well known hard rubber puck used on ice while maintaining both speed and accuracy.

The present invention is for a puck for use on a non ice surface such as cement asphalt or wood which puck is generally cylindrical in shape. The puck includes an outer ring, having an outer ring surface, an inner ring surface, a top and a bottom. At least three fixed runners extend upwardly from the top and downwardly from the bottom surfaces of the puck. An open area is present inwardly from the inner ring surface. The puck is fabricated from an generally elastic material so that the outer ring will deflect slightly when the puck is struck against a wall or other object. Preferably a central member is supported inwardly from the outer ring and is preferably attached thereto by several connecting members or arms.

BRIEF DESCRIPTION OF THE DRAWINGS

FIG. 1 is a perspective view showing the top and front surface of the present invention.

FIG. 2 is a cross sectional view taken along line 2—2 of FIG. 1.

FIG. 3 is a plan view thereof.

FIG. 6 is a perspective view showing top and front of an alternate embodiment of the puck of FIG. 1.

FIG. 7 is a cross sectional view of one of the runners of the puck of FIG. 1.

FIG. 8 is a cross sectional view of one of the runners of the puck of FIG. 5.

FIG. 9 is a an exploded cross sectional view of an alternate embodiment of the runner of FIG. 7.

FIG. 10 is a cross sectional view of an alternate embodiment of the runner of FIG. 7.

FIG. 11 is a plan view of the runner of FIG. 10.

FIG. 12 is a perspective view showing the top and front surface of an alterante embodiment of the present invention.

FIG. 13 is a cross sectional view taken along line 13—13 of FIG. 12.

FIG. 14 is a plan view thereof.

FIG. 15 is a cross sectional view of an alternate embodiment of the runner of FIG. 7.

FIG. 16 is an alterante embodiment of the runner of FIG. 7.

FIG. 17 is an alternate embodiment of the runner of FIG. 7.

FIG. 18 is a cross sectional view of an alternate runner holding receptacle.

DESCRIPTION OF THE PREFERRED EMBODIMENT

Figure 4:
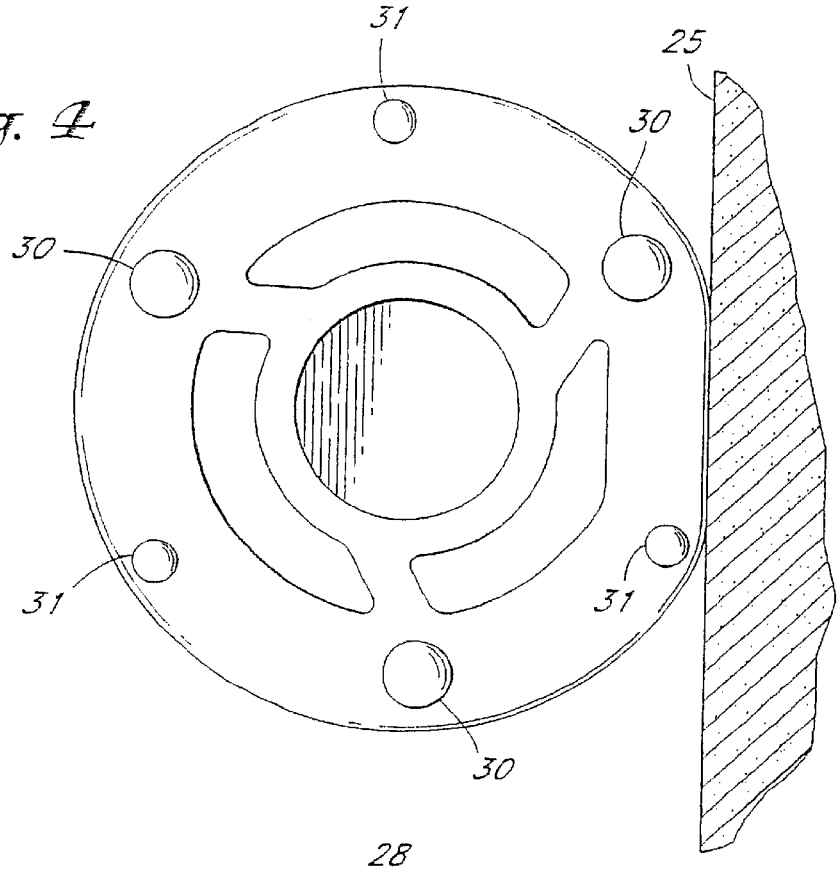
FIG. 4 is a plan view showing the puck of FIG. 1 impacting a wall.

The puck of the present invention is shown in perspective view in FIG. 1 and indicated by reference character 10. Puck 10 is generally cylindrical in shape and has an upper surface 11, and outer peripheral surface 12, and a lower surface 13. An outer ring 26 and an inner ring surface 15. A central member 14, is held to outer ring 26 by three arms 16, 17, and 18. Three runners 19, 20, and 21 extend upwardly from upper surface 11 and downwardly from lower surface 13. These runners are fabricated from a material which has a low co-efficient of friction with the non-ice surface 22 shown in FIG. 2 so that the puck will slide along the surface in a manner analogous to a rubber puck on an ice surface. Stainless steel or hardened steel has been successfully used and other low friction metals or polymers can also be used. The runners should be relatively near the outer peripheral surface 12 so that the puck will tend to stay with its either upper or lower surface adjacent the non ice surface 22.

Central member 14 has a recess 23 which can contain logo or other indicia in a protected manner and adds to the appearance of the puck. Furthermore, the depth of the recess, the size of the inner area and the open space can be varied to change the overall weight of the puck to conform to the varied types of runners and to adapt to professional play or amateur play. Recess 23 is present both in the upper and lower surfaces of the central member 16 as shown in FIG. 2.

Figure 5:
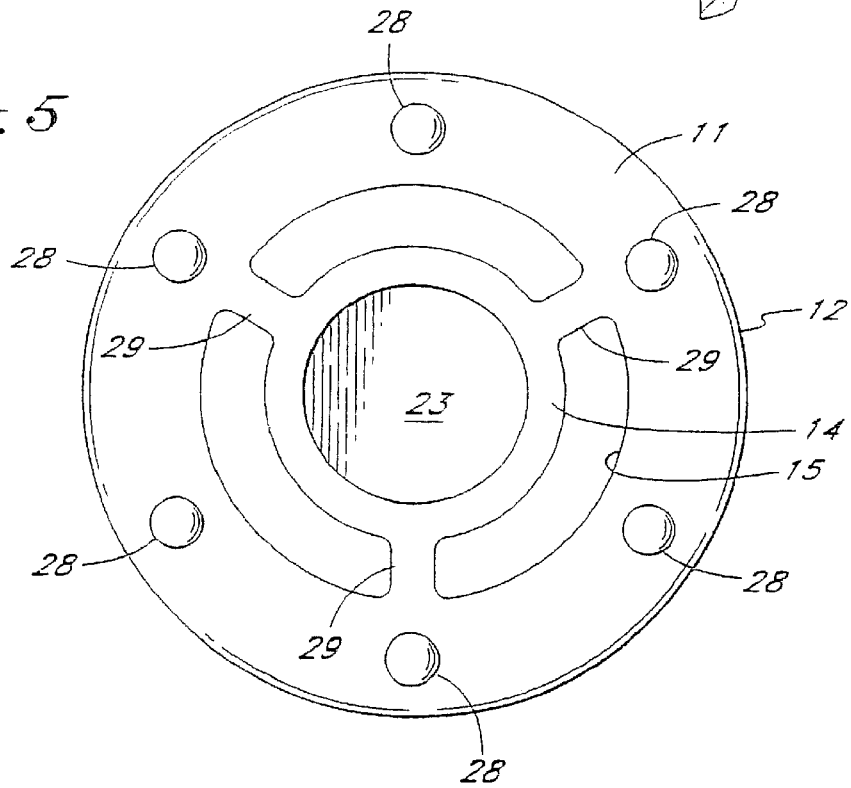
FIG. 5 is a plan view of an alternate embodiment.

Arms 16, 17, and 18 are preferably but not necessarily curved so that the puck will tend to deflect as shown best in FIG. 4 no matter where the outer surface strikes the wall 25. Arms 29 in FIG. 5 are shown straight. The puck is shown in plan view in FIG. 3 and in plan view striking a wall 25 in FIG. 4. The puck is preferably fabricated from polyurethane or other generally elastic polymer or elastomer. This permits the outer ring 26 to be deflected which provides a level of safety in the event a puck should strike a player and avoids excess bounce off the boards or the surface of the floor. Outer ring 26 has a top surface 11. An outer ring surface 12, an inner ring surface 15, and a bottom surface 13. Preferably the runners 19 are held in the outer ring 26. There should, of course, be at least three runners as shown in FIGS. 1, 2, and 3. Six runners, however, may also be used, and may either be equally sized as shown by runners 28 in FIG. 5 or alternating large runners 30 (FIG. 4) and smaller runners 31. Note that in FIG. 4 the smaller runners 31 are centered nearer the edge of the puck then the center of large runners 30. This will cause the runners 31 to contact the playing surface when the puck is at a smaller angle with respect to the playing surface then if they were centered on the same circle as the center of runners 30.

An alternate embodiment puck is shown in FIG. 6 in perspective view and indicated generally by reference character 32. This design was also made and tested in play. The puck is of a similar design from that shown in FIG. 1 except that three upper grooves 33, 34, and 35 are formed in the top surface 11' of outer ring 26'. The lower surface also has three grooves one of which is indicated by reference character 36. These grooves have an upper surface which is co-planar with arms 16', 17' and 18'. The three runners 37 have a pair of blind holes 40 to permit the removal and replacement of the runners. It has been found that it is very beneficial that the weight be concentrated near the outside and the positioning of the runners near the edge of the puck helps to accomplish this where metal runners are used.

Various types of runners are shown in FIGS. 7, 8, 9, 10 and 11. A solid stainless steel runner is shown in FIG. 7 and indicated by reference character 30. Runner 30 has an upper head 41 and a lower head 42 and is fabricated from stainless steel, titanium, or other high abrasion resistant metal. Runner 30 is placed in the mold before the polyurethane or other material is injected therein. The central portion 43 is captured completely within the outer ring 26 as shown in FIG. 2. A nylon or other plastic type runner 31 as shown in FIG. 8 and has an upper head 45, a lower head 46 and a central portion 47. The smaller runners may also be steel. This is also placed in the mold before the puck is formed around it. Both upper and lower heads 45 and 46 extend a lesser distance away from the top and bottom of the puck as compared the upper and lower heads 41 and 42 of runners 30 which are identical to runner 19 in FIG. 7. Therefore, the puck of FIG. 4 basically rides along runners 30 but when slightly tipped will contact the upper or lower head of runner 31. This prevents the body of the puck from rubbing along the surface of play which would slow the puck.

A replaceable type of runner is shown in FIG. 9 and indicated by reference character 48. Replaceable runner 48 has a removable upper head 49 and a removable lower head 50. These have a pair of blind holes analogous to head 51 shown in FIG. 11. The blind holes are indicated by reference character 40. This permits a tool with a pair of pins to be inserted in hole 40 so that the heads can be unscrewed and replaced. The central portion 52 has a threaded portion 53 and a generally conical portion 54 including a plurality of serrations. The serrations contact the serrations 55 in the under surface of head 49 so that the head will not become unscrewed during play.

Another style of removable and replaceable runner is shown in FIG. 10 where the upper head 51 has a threaded shank 57 which screws into a threaded blind hole 58 in central portion 59. Central portion 59 is integral with lower head 60, which should also contain a pair of blind holes 40 as shown in FIG. 11 as should upper head 51. Central portion 59 can be metallic or fabricated from a polymer.

Typically the puck has an outside diameter between 3¼" to 3½" and is between ¾" and 1" high. The preferred weight is 3½ oz. to 4½ oz. for professional use, lighter for amateur use. As shown best in FIG. 2, the central member 14 and arms 16, 17, and 18 are formed below top surface 13 and above bottom surface 29 of the outer ring so that the entire contact of the puck with the surface is on the runners of the outer ring and if the runners wear down, still only the outer ring contacts the surface. The arms are either curved from ring 26 to central member 14 or they may be straight as shown in FIG. 5. Central member 14 has a vertical central axis 16' which is also the vertical central axis of puck 10 when it is on a horizontal non ice surface such as that shown in FIG. 2 and indicated by reference character 22.

The grooves as shown in FIG. 6 help permit air to pass in and out of the center portion and help reduce the tendency of the puck to lift or hug the cement surface. The grooves may also be made in a different color and add greatly to the appearance of the puck in play. Similar advantage is created by the opening in the center area. While the runners are shown as being placed in the mold and the puck molded around them, the process can, of course, be reversed where an opening is formed in the puck as it is molded and the runner is molded therein in a later process step. Runners useful for this embodiment are shown in FIGS. 15, 16, and 17. In FIG. 15 a runner generally indicated by reference character 64 is secured in the outer ring 26 of a puck. Runner 64 has a lower head 65 which is integral with a hollow shaft 66 which has a central opening 67. The upper head 70 is integral with a shank 69 which has a friction fit within central opening 67. The puck is molded with a cylindrical opening 71 for each runner and hollow shaft 66 is inserted through opening 71. Next shank 69 which is tapered at 68 is placed in the open end of central opening 67. Pressure is applied to force the shank 69 into the central opening 67 to provide a secure and permanent friction fit.

A runner 72 is shown in FIG. 16 and has an upper head 73 a lower head 74 a hollow shaft 75 with a central opening 76 upper head 73 has a tapered shank 77 which is tapered at 78. This unit is fabricated from a plastic such as ABS or nylon or polycarbonate or the like which has sufficient strength and a low coefficient of friction with a cement or other playing surface.

Runner 80 shown in FIG. 17 is analogous to runner 72 of FIG. 16 except there is a plurality of inwardly protecting serrations 81 along the central opening 82. A plurality of upwardly projecting serrations 83 is formed on shank 84 as the upper head 85 and shank 84 are driven into central opening 82 the serrations 81 and 83 interconnect causing the shank 84 to be securely held in central opening 82. It is also advantageous to utilize replaceable runners so that if the game is played on a wooden surface, that runners which would not damage the wood surface, can be inserted in place of, for instance, stainless steel runners. Also the runners form a point of wear and it is advantageous that a runner be removable and replaceable as are the runners shown in FIGS. 9 and 10.

A cross-sectional view of a portion of outer ring 26 is shown in cross sectional view in FIG. 18. A threaded opening or receptacle is shown molded in ring 26 and indicated by reference character 63. A threaded runner may be coated with an adhesive and screwed into opening 63.

It is desirable that some means be available to decrease the tendency of the puck to roll along its side. Such a provision is shown in FIGS. 12, 13 and 14 where protrusions 61 and 62 are formed on the exterior of the outer ring surface 12. The protrusions are not large enough to interfere with the shooting of the puck but will decrease its tendency to remain on its side.

The design of the present invention provides an unusually dynamic appearance, both during play and at rest. The amount of bounce is achieved which provides movement during play remarkably similar to that of the conventional puck used for ice hockey. The term "elastic" as used herein, is intended to convey the property of returning an original shape after deflection but does not necessarily convey a high degree of bounce. The weight of the puck can be easily varied by reducing or enlarging the width of the space between the outer ring and the central member 14 as well as the thickness of the central member.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A puck for use on a non-ice surface, said puck having a puck body which is generally cylindrical in shape and molded from a polymer and having an upper surface, a lower surface and an outer peripheral surface and having a vertical central axis when its upper or lower surface is resting on a horizontal floor, said puck comprising:

a puck body having a plurality of runners held by said puck body, each of said runners having a shaft portion held by said puck body and the plurality of runners having heads which extend above the upper surface and below the lower surface, said runners being located near the outer peripheral surface of said puck the runner heads being positioned so that the puck rests on a plurality of the runners when on a horizontal floor, and said runners being fabricated from a polymer which has a lower coefficient of friction than the polymer from which the puck body is formed.

2. The puck of claim 1 wherein said runners are fabricated from nylon.

3. The puck of claim 1 wherein said runner has a central shaft and an upper runner head on an upper end and a lower runner head at a lower end.

* * * * *